C. F. GROS.
SIX-WHEELED MOTOR VEHICLE.
APPLICATION FILED NOV. 4, 1918.

1,310,395.

Patented July 15, 1919.

Inventor:-
Claude François Gros.
By:- B. Singer. Atty.

UNITED STATES PATENT OFFICE.

CLAUDE FRANÇOIS GROS, OF PUTEAUX, FRANCE.

SIX-WHEELED MOTOR-VEHICLE.

1,310,395. Specification of Letters Patent. Patented July 15, 1919.

Application filed November 4, 1918. Serial No. 261,089.

*To all whom it may concern:*

Be it known that I, CLAUDE FRANÇOIS GROS, residing at Puteaux, France, have invented new and useful Improvements in or Relating to Six-Wheeled Motor-Vehicles, of which the following is a specification.

This invention relates to a six wheeled motor vehicle provided with a bogie truck and with a spring suspension insuring constant contact of the six wheels with the ground whatever be the unevenness of the latter, and at the same time securing constant distribution of the load on the three axles of a six-wheel car. These results are obtained by the use of suitably connected springs, and of a general arrangement insuring the maximum simplicity with the minimum of moving parts, hence an economy in weight, price and upkeep.

The invention is illustrated in the accompanying drawings in which—

Figure 1:
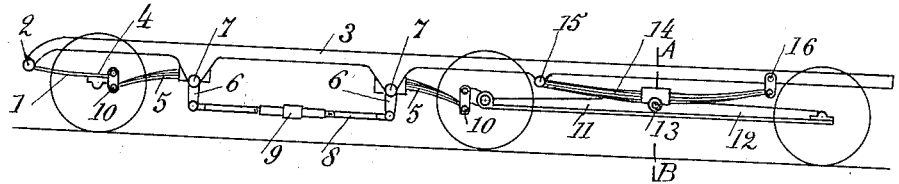
Figure 1 is a side elevation.
Figure 2:
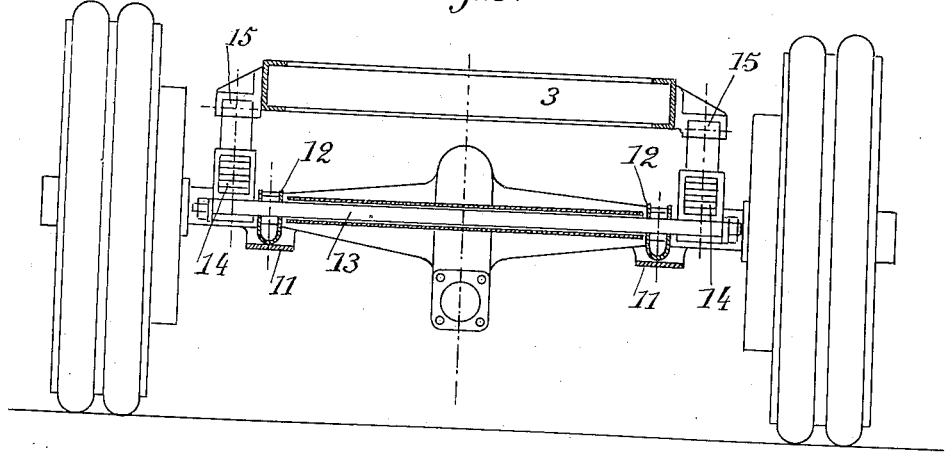
Fig. 2 is a cross-section on the line A—B through the rear bogie.

Traction plates 1 are secured to front spring carrier arms 2 of the chassis 3, and to the spring seating of the front steering axle. These traction plates are provided in front with eyes for the suspension shackles in the usual manner.

Then come two pairs of springs 5 rigidly connected to levers 6, the said levers and springs being pivoted about pins 7 secured to the longitudinal members of the chassis 3. The pairs of springs 5 and levers 6, are connected together by rods 8 which can be of a fixed length or of a length varied by a turn buckle 9 which enables the tension of the springs 5 to be varied.

These springs 5 and rods 8, are connected to the front axle and to the rear bogie by ordinary shackles 10.

The rear bogie comprises a central axle and a rear steering axle connected together by wide flat plate springs 11 called "warping plates" in view of their function which consists in connecting together the two rear axles, in forming under the vehicle a small independent chassis, without at the same time opposing any "warping" movement that the axles thus connected may execute relatively to each other owing to unevenness of the ground.

The warping plates 11 are provided at the top with U-shaped sections 12 which strengthen them and prevent them from sagging under the action of the load which is carried on a pin 13 forming the hinge pin for large rear springs 14 inserted between the bogie and the chassis 3.

The warping plates 11 and the U-shaped sections 12 connected together by bolts which, while insuring connection of the said parts, leave perfect freedom of torsion to the warping plates 11.

The U-shaped sections 12 are carried centrally on the pin 13 and on which are pivoted large springs 14, the longitudinal members and the rear bogie being thus secured together by fixed attachments 15 and shackles 16.

It will be seen that all the moving parts are exposed to tension, and in one direction only, any reciprocating motion which is a source of noise and of premature wear, thus being avoided.

Figure 3:
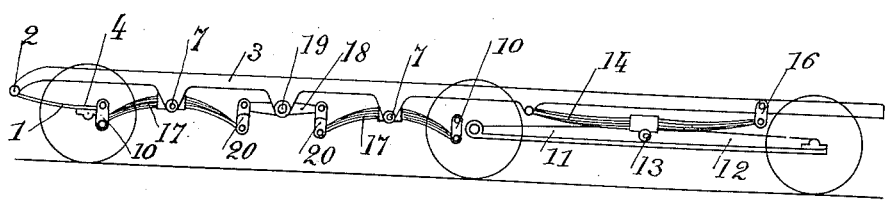
Fig. 3 shows a modified construction of the suspension.

The modified construction shown in Fig 3, differs from the previously described construction, merely by the omission of the connecting rods 8 and by the use of complete inverted springs 17, in place of the half-springs 5.

The inverted springs 17 are in this construction connected together by balance beams 18 swinging about pins 19 secured to the longitudinal members of the chassis 3, and these balance beams are connected to the ends of the springs 17 by links 20. The rest of the construction is similar to that illustrated in Fig. 1.

It is advisable to use longitudinal members in the form of an inverted U, so that the balance beams are able to move in the interior of the said members.

Figure 4:
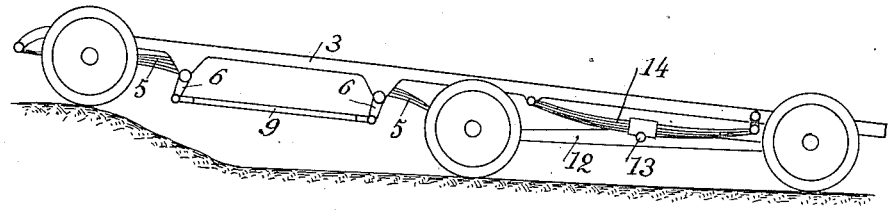
Fig. 4 shows the chassis in the act of rising over an obstacle in front.
Figure 5:
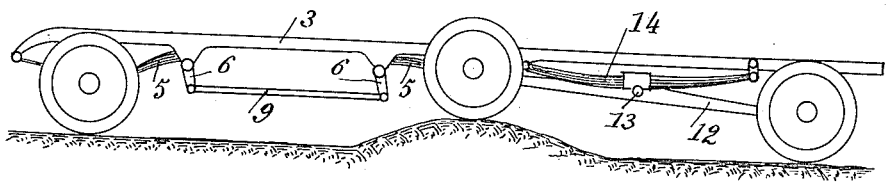
Fig. 5 shows the chassis at the moment when the middle wheels are passing over an obstacle.

On examining the Figs. 4 and 5, the working of the system will be readily understood. When the front wheels are passing over an obstacle (Fig. 4), the load forces the central wheels to bear on the ground. The front half-springs 5 rise and, owing to the levers 6 and the connecting rods 9, the rear half-springs are lowered. As regards, the springs 14, they naturally assume a position in accordance with the oblique position of the chassis 3 relatively to the truck, by turning about the pin 13. Moreover, owing to the resiliency of the plates 11, the chassis 3 can even assume in the transverse direction an oblique position relatively to the truck. It follows that the six wheels of the vehicle are always in contact with the ground, whatever its irregularities, and always support the load all together.

It will be seen that the same will be the case when either the central wheels (Fig. 5) or the rear wheels pass over an obstacle, owing to the pivoting of the various springs and to their invention.

The system which is more particularly applicable to road vehicles, can also be applied to vehicles traveling on rails. In the latter case, the end steering axles become superfluous and are replaced by ordinary fixed axles.

Having now particularly described and ascertained the nature of my said invention and in what manner the same is to be performed, I declare that what I claim is:

1. A bogie chassis with balanced suspension for six wheel motor vehicles, characterized by the combination with a vehicle chassis, of a bogie truck arranged at the rear and underneath the same, plate springs interposed between the bogie and the chassis, inverted springs connected, one to the front axle of the chassis and the other to the front axle of a bogie, pins secured to the chassis and supporting the inverted springs, means for interconnecting the said inverted springs, and traction plates connecting the front axle to the front arms of the longitudinal members of the chassis, substantially as described and for the purpose set forth.

2. A bogie chassis with balanced suspension for six wheel motor vehicles, characterized by the combination with a vehicle chassis, of a bogie truck arranged at the rear of the chassis, plate springs arranged between the bogie and the chassis, a pin staying the sides of the bogie and on which pin the plate springs are pivoted, inverted springs connected one to the front axle and the other to the front of the truck, pins secured to the chassis and supporting the inverted springs, pivoted balance beams on each longitudinal member of the chassis, small connecting rods pivoted to the ends of the balance beams and to the corresponding ends of the said inverted springs, and traction plates connecting the front axle to the front spring carrier arms of the longitudinal members of the chassis, for the purpose specified.

3. A bogie chassis with balanced suspension for six wheel motor vehicles, characterized by the combination with a vehicle chassis, of a bogie truck arranged at the rear of the chassis, the said bogie being constituted by elastic metal blades arranged at each side and by rigid U shaped sections arranged on the said metal blades and carrying the pivot pin or pins for the rear suspension springs, for the purpose specified.

In testimony whereof I affix my signature in presence of two witnesses.

CLAUDE FRANÇOIS GROS.

Witnesses:
 JOHN F. SIMONS,
 O. REBSENET.